// Patented Nov. 22, 1949

UNITED STATES PATENT OFFICE 2,489,094

PREPARATION OF THIOACETAMIDES

Charles L. Levesque, Philadelphia, Pa., assignor to Rohm & Haas Company, Philadelphia, Pa., a corporation of Delaware No Drawing. Application April 28, 1948, Serial No. 23,850

5 Claims. (Cl. 260—247)

This invention relates to a method for preparing thioacetamides having the general formula

in which X is a monovalent heterocyclic radical of a member of the class consisting of morpholine, piperidine, and pyrrolidine, said heterocyclic radical being joined to the thioacetyl portion of the molecule through its imino-nitrogen atom.

The compounds are prepared according to this invention by reacting under anhydrous conditions at a temperature from 80° C. to 300° C. equimolar amounts of sulfur, a vinyl ether or ester, and a heterocyclic imino compound from the class consisting of morpholine, piperidine, and pyrrolidine. The reaction which is involved is best illustrated by the following equations which show the reactions involving morpholine:

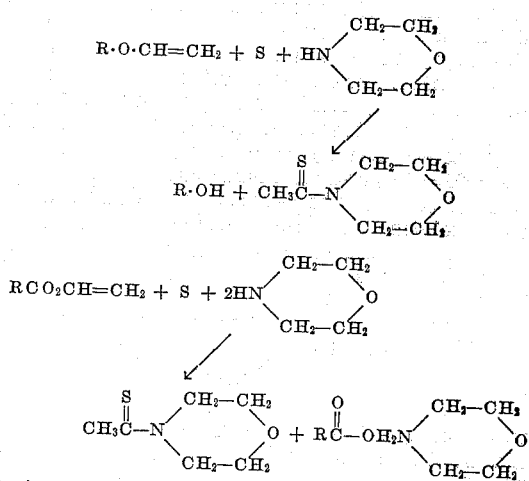

In the equations, R represents a monovalent organic radical, preferably a hydrocarbon radical. The other two heterocyclic imines react in a similar manner and the products thereof have the following formulas:

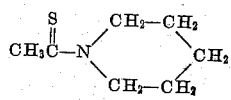

from piperidine, and

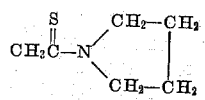

from pyrrolidine.

An extremely large variety and number of vinyl ethers and esters of vinyl alcohol are operable and consequently the characters R represent a great many monovalent organic radicals. It is preferred from the standpoint of economy and efficiency of operation to employ those ethers and esters in which R is a hydrocarbon group, particularly an alkyl group. It is apparent from the equation above that the group R remains intact during the reaction of this invention and that an alcohol R—OH or an acid salt as shown above is obtained which subsequently may be respectively reconverted into a vinyl ether, $R \cdot O \cdot CH = CH_2$, or a vinyl ester, $R'CO_2CH = CH_2$, by conventional means. Since the alcohol, R—OH, or acid, $RCO_2H$, from which the initial vinyl ether or ester is prepared, is recovered and available for reconversion to the ether or ester, there is no advantage to be gained by employing vinyl derivatives which are costly or difficult to obtain.

As stated, the preferred class of compounds is that in which R is a monovalent hydrocarbon radical such as an alkyl, cycloalkyl, or aralkyl radical. Examples of such radicals are the butyl, cyclohexyl, and benzyl radicals respectively. Vinyl ethers and esters in which R is an alkyl group of 1 to 18 carbon atoms are particularly recommended and are exemplified by the isomeric butyl vinyl ethers, the isomeric octyl vinyl ethers, lauryl vinyl ether and octadecyl vinyl ether, or vinyl acetate, vinyl laurate, vinyl stearate, etc.

The reaction which takes place at temperatures from 80° C. to 300° C. and preferably from 100° C. to 150° C. may be carried out in the presence of an anhydrous solvent such as dioxane or pyridine. The reaction in any case is conducted under anhydrous conditions.

While the three reactants, sulfur, vinyl derivative, and heterocyclic imine, react in equimolecular ratios, it is desirable to employ an excess of the sulfur and the imine. Thus, it is recommended that two to four moles each of the sulfur and imine be heated with each mole of vinyl ether or ester. The reaction can be conducted under pressure.

The following examples serve to illustrate the process of this invention.

Example 1

A mixture of 87 grams (1.0 mole) of morpholine and 40 grams (1.25 moles) of sulfur was placed in a three-necked balloon flask equipped with reflux condenser, thermometer, and mechanical stirrer. The mixture was stirred and heated to refluxing temperature, at which point was slowly added 50 grams (0.5 mole) of butyl vinyl ether.

Heating at the refluxing temperature was continued for three hours, after which 20 ml. of V. M. and P. naphtha was added and the mass was allowed to cool to room temperature. Sixty-five grams of crystals which formed were filtered off, dried, and distilled at a pressure of 2 mm. The distillate was then recrystallized from benzene and the first crop of crystals weighed 26.4 grams and had a melting point of 89°–90° C. The product was thioacetomorpholide of the formula

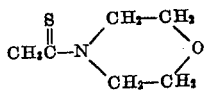

as indicated by the analysis: Found: S, 22.24%; N, 9.62%; mol. wt., 146. Theoretical: S, 22.05%; N, 9.65%; mol. wt. 145.

*Example 2*

In a similar manner 50 grams of morpholine, 6.4 grams of sulfur, and 29.6 grams of octadecyl vinyl ether were mixed and heated at refluxing temperature for six hours. The reaction mixture was then poured into 200 ml. of methanol. Crude octadecanol to the extent of 19.5 grams separated, was removed by filtration, and recrystallized. It had a melting point of 59°–60° C. and, when mixed with an authentic sample of octadecanol, did not depress the melting point of the latter.

Thioacetomorpholide, identical with the product of Example 1, was recovered from the filtrate.

In a similar manner piperidine and pyrrolidine are reacted with sulfur and alkyl vinyl ethers.

*Example 3*

A mixture of 24 grams of sulfur (0.75 mole), 47.5 grams of piperidine (0.5 mol), and 100 cc. of pyridine was placed in a three-necked flask fitted with reflux condenser, stirrer, and dropping funnel. The mixture was heated to boiling and 16.7 grams of vinyl butyl ether (0.167 mole) added over a period of 25 minutes. Refluxing was continued for three hours. The mixture was cooled, diluted with 100 cc. of chloroform, washed with water, then with dilute hydrochloric acid and finally with water. The washed solution was dried over Na₂SO₄ and evaporated in vacuo. The semi-crystalline residue was spread on a porous plate and finally yielded 16.1 grams of lightbrown crystals. The crystals were purified by two recrystallizations from a mixture of xylene and petroleum ether. They had a melting point of 56.0–57.0° C. Analysis corresponded to that calculated for N-thioacetylpiperidine, $C_7H_{13}NS$.

*Example 4*

Vinyl acetate (43 grams, 0.5 mole) was slowly added to a refluxing mixture of 174 grams of morpholine (2 moles) and 64 grams of sulfur (2 moles). Refluxing was continued for four hours. The cooled mixture was diluted with 300 cc. of chloroform, then washed with water, dilute hydrochloric acid, and again with water. The dried material was treated with decolorizing carbon, evaporated in vacuo, and cooled. Thirty grams of colorless crystals, melting between 86°–88° C., were obtained.

Second and third crops of crystals, weighing 5.8 grams, and 6.0 grams, of slightly less pure product were obtained by further chilling. The crops were combined and, after one recrystallization from a mixture of benzene and petroleum ether, thioacetomorpholide, melting between 89°–90° C., identical with that obtained in Example 1, was obtained.

Piperidine and pyrrolidine react in the same way with sulfur and vinyl esters.

I claim:

1. The process of preparing thioacetamides having the general formula,

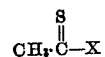

in which X is a monovalent heterocyclic radical of a member of the class consisting of morpholine, piperidine, and pyrrolidine, said heterocyclic radical being joined to the thioacetyl portion of the molecule through its imino-nitrogen atom which comprises reacting under anhydrous conditions and at a temperature from 80° C. to 300° C. equimolar amounts of sulfur, a heterocyclic imine from the class consisting of morpholine, piperidine, and pyrrolidine, and a member of the class consisting of vinyl ethers and vinyl esters having respectively the formulas $R \cdot O \cdot CH=CH_2$ and $RCOOCH=CH_2$ in which R is a monovalent hydrocarbon radical from the class consisting of alkyl, cycloalkyl, and aralkyl groups, and thereafter isolating said thioacetamide.

2. The process of preparing thioacetamides having the general formula,

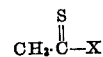

in which X is a monovalent heterocyclic radical of a member of the class consisting of morpholine, piperidine, and pyrrolidine, said heterocyclic radical being joined to the thioacetyl portion of the molecule through its imino-nitrogen atom which comprises reacting under anhydrous conditions and at a temperature from 80° C. to 300° C. equimolar amounts of sulfur, a heterocyclic imine from the class consisting of morpholine, piperidine, and pyrrolidine, and a member of the class consisting of vinyl ethers and vinyl esters having respectively the formulas $R \cdot O \cdot CH=CH_2$ and $RCOOCH=CH_2$ in which R is an alkyl group of 1 to 18 carbon atoms, and thereafter isolating said thioacetamide.

3. The process of preparing a thioacetamide having the formula

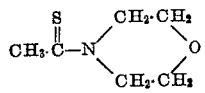

which comprises reacting under anhydrous conditions and at a temperature from 80° C. to 300° C. equimolar amounts of sulfur, morpholine, and an alkyl vinyl ether in which the alkyl group contains 1 to 18 carbon atoms and isolating said thioacetamide.

4. The process of preparing a thioacetamide having the formula

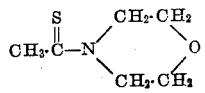

which comprises reacting under anhydrous conditions and at a temperature from 80° C. to 300° C. equimolar amounts of sulfur, piperidine, and an alkyl vinyl ether in which the alkyl group contains 1 to 18 carbon atoms and isolating said thioacetamide.

5. The process of preparing a thioacetamide having the formula

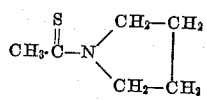

which comprises reacting under anhydrous conditions and at a temperature from 80° C. to 300° C. equimolar amounts of sulfur, pyrrolidine, and an alkyl vinyl ether in which the alkyl group contains 1 to 18 carbon atoms and isolating said thioacetamide.

CHARLES L. LEVESQUE.

REFERENCES CITED

The following references are of record in the file of this patent:

Pattison et al.: J. Am. Chem. Soc. 68, 2033–2035 (1946).

Carmack et al.: J. Am. Chem. Soc. 68, 2029–2033 (1946).

Adams et al.: Organic Reactions, vol. 3, page 88 (1946), John Wiley and Sons, Inc., New York, N. Y.